United States Patent
Stöhr et al.

(10) Patent No.: US 11,693,444 B2
(45) Date of Patent: Jul. 4, 2023

(54) ADAPTIVE OPERATING DEVICE

(71) Applicant: elobau GmbH & Co. KG, Leutkirch (DE)

(72) Inventors: Ingmar Stöhr, Aichstetten (DE); Timo Schempp, Stuttgart (DE); Andreas Kaufmann, Stuttgart (DE); Markus Schmid, Leinfelden-Echterdingen (DE)

(73) Assignee: ELOBAU GMBH & CO. KG, Leutkirch (DE)

( * ) Notice: Subject to any disclaimer, the term of this patent is extended or adjusted under 35 U.S.C. 154(b) by 267 days.

(21) Appl. No.: 16/911,708

(22) Filed: Jun. 25, 2020

(65) Prior Publication Data

US 2020/0409406 A1    Dec. 31, 2020

(30) Foreign Application Priority Data

Jun. 28, 2019 (DE) ..................... 10 2019 117 604.2

(51) Int. Cl.
| | |
|---|---|
| *G05G 1/10* | (2006.01) |
| *B60K 37/06* | (2006.01) |
| *G05G 1/01* | (2008.04) |
| *G05G 1/04* | (2006.01) |

(52) U.S. Cl.
CPC ............ *G05G 1/10* (2013.01); *B60K 37/06* (2013.01); *G05G 1/01* (2013.01); *G05G 1/04* (2013.01); *B60K 2370/126* (2019.05); *B60K 2370/131* (2019.05); *B60K 2370/135* (2019.05); *B60K 2370/139* (2019.05); *B60K 2370/682* (2019.05)

(58) Field of Classification Search
CPC ................ G05G 1/01; B60K 2370/682; B60K 2370/135
See application file for complete search history.

(56) References Cited

U.S. PATENT DOCUMENTS

| | | | | |
|---|---|---|---|---|
| 2012/0065847 | A1* | 3/2012 | Hobenshield | E02F 9/2004 701/50 |
| 2013/0333510 | A1* | 12/2013 | Paakkinen | A01G 23/003 74/490.12 |
| 2018/0058038 | A1* | 3/2018 | Fredrickson | E02F 9/2012 |
| 2018/0338406 | A1 | 11/2018 | Jacobs et al. | |
| 2020/0062120 | A1 | 2/2020 | Schmid et al. | |

FOREIGN PATENT DOCUMENTS

| | | |
|---|---|---|
| DE | 19645211 A1 | 5/1998 |
| DE | 10059794 A1 | 6/2002 |
| DE | 10325850 A1 | 12/2004 |

(Continued)

*Primary Examiner* — Vicky A Johnson
(74) *Attorney, Agent, or Firm* — Dickinson Wright PLLC

(57) ABSTRACT

An adaptive operating device (1) has at least one operating area (2) with at least one manually operable operating element (3). At least one of the operating elements (3) is arranged on an operating module (4) formed as a cylinder (5) rotatably mounted in the operating area (2). The operating device (1) further includes a configuration device (6) which, by changing the rotational position of the operating module (4) and/or changing the functionality of the operating element (3), configures the at least one operating element (3) in such a way that a movement of the operating element (3) corresponds to an identical movement of an item of work equipment (9) which is attached when in use.

13 Claims, 2 Drawing Sheets

(56) References Cited

FOREIGN PATENT DOCUMENTS

| DE | 102007003734 A1 | 7/2008 | | |
|---|---|---|---|---|
| DE | 202012006899 U1 | 10/2013 | | |
| DE | 102013001386 A1 | 7/2014 | | |
| EP | 823347 A1 * | 2/1998 | ............ | B60K 37/06 |
| EP | 0823347 A1 | 2/1998 | | |
| EP | 3312041 A1 | 4/2018 | | |
| EP | 3616488 A1 | 3/2020 | | |
| WO | WO-0117814 A1 * | 3/2001 | ............ | B60K 37/06 |

* cited by examiner

ADAPTIVE OPERATING DEVICE

TECHNICAL FIELD

The present invention relates to an adaptive operating device especially for agricultural tractors.

BACKGROUND

Tractors are an essential component of every stock of equipment especially in agriculture, but also in building and in forestry. Tractors provide different drives, are mobile and have thus become established as a universal tool, with which the most diverse items of work equipment can be operated. The term work equipment is understood to mean, apart from devices such as wood splitters, saws, winches, finger-bar mowers, ploughs, cultivators and suchlike, also work equipment provided with wheels, such as loader trucks, manure spreaders, manure barrels, feed trucks, beet harvesters, bailing presses and others.

As this short list already shows, a tractor has to comprise, apart from the usual operating elements—also referred to as HMI (human machine interface)—for the control of its movements, an additional multiplicity of operating elements for operating the respective item of work equipment.

These operating elements have hitherto been assigned to the different drives and lifting gear and are usually combined in an operator armrest beside the driver's seat. Apart from knobs, pushbuttons and switches, this operating area usually also comprises one or more joysticks as operating elements, but also a monitor as a display element. These known operating elements control specific devices on the tractor in an unchangeable way, for example the up-down movement of the rear linkage. The standardized operating devices of the prior art are combined into basic generic functional groups, in particular the functional groups for operating the three-point linkage, the power take-off shaft and selective control valves for operating hydraulic cylinders and motors. An operator is thus faced with a multiplicity of operating elements, easily up to 50, which are generically labelled. If the operator has not noticed how he has attached the, in particular hydraulic, drives of the item of work equipment to the tractor or takes over a tractor from another user with an already attached item of work equipment, he has to work through a multiplicity of combinations before he has determined the operating elements of the hydraulics relevant to the item of work equipment and also found out their actuating direction and has permanently memorized the latter. Incorrect operations and lost time are therefore almost inevitable, since it is not possible to see from the generically labelled operating element of the hydraulics whether and which function of the item of work equipment it controls. It is of course also normal for an operating element to be moved to the right/to the left, but to control an up/down function. A user is thus faced with the difficulty of finding that his expectations are not compatible with the actual operation.

The advantage for an operator that all the operating elements of a group of functions are combined, however, also has, apart from those described, the further drawback that a frequent change of position of his operating hand or his operating arm from function group to function group is possibly required.

A rotatably mounted cylinder with a plurality of different operating surface areas is known from DE 196 45 211 A1, which can be made accessible to a user by rotating the cylinder or can be rotated away out of the latter's field of influence, wherein each operating surface area comprises operating elements.

An operating device is known from DE 10 2013 001 386 A1, comprising a support element, in particular a rotatably mounted support element, on which a plurality of operating surface areas with function elements arranged thereon in each case are provided, which can either be made accessible to a user or concealed from the latter by rotating the support element.

An operating device is known from DE 103 25 850 A1, comprising a rotatably mounted cylinder, on which a plurality of operating areas with operating elements arranged thereon in each case are provided, wherein an accessible operating area can be made inaccessible by a rotational movement, whilst an inaccessible operating area is transferred into an accessible position.

An operating device in the form of a rotatably mounted support is known from EP 0 823 347 A1, which can be driven by an actuator and rotated into a desired rotational position, wherein one individual operating area is made accessible to a user in each possible rotational position.

SUMMARY

An objective underlying the present invention, therefore, is to prevent this drawback and to specify a suitable device.

The device problem is solved by an adaptive operating device, at least one operating area, wherein at least one operating area has at least one manually operable operating element, wherein at least one of the operating elements is arranged on an operating module, which is constituted as a cylinder rotatably mounted in the operating area, wherein the operating device also comprises a configuration device which, by changing the rotational position of the operating module (4) and/or changing the functionality of the operating element (3), configures the at least one operating element (3) in such a way that a movement of the operating element (3) corresponds to an identical movement of an item of work equipment (9) which is attached when in use.

To great advantage, the invention enables a functionality of the operating device that is tailored to the user's current requirements, so that wholly different functions can be retrieved with one and the same operating element. Operating elements in the form of buttons or other operating devices in one angular position of the cylinder can for example thus control a forward/backward movement, whereas in a second angular position diverging from the latter they bring about an upward/downward movement of an item of work equipment to be controlled by them. In the simplest case, the configuration merely consists in putting the operating element out of the reach of a user by rotating the cylinder, i.e. the configuration device in a rotational drive of the cylinder. The configuration device according to the invention brings the cylinder into the desired rotational position and/or configures the functionality of the operating elements on the cylinder. The change in the rotational position of the operating module is accompanied by a change in the position of at least one operating element arranged thereon, so that for example, in relation to space, an upward/downward movement of the operating element becomes a forward/backward movement of the operating element after changing the rotational position, wherein the movement of the operating element is constant in relation to the operating module. According to the invention, the functionality of the at least one operating element is understood to mean its movement, in particular in relation to the operating module. Thus, this functionality of the operating element with the same or a changed rotational position of the operating module relative thereto can for example be changed from a possible forward/backward movement, in which a sideways movement is blocked, into an enabled sideways movement, in which a forward/backward movement is blocked. To great advantage, it is thus made possible to configure one, several or all the operating elements of a cylinder and therefore an operating area of the adaptive operating device so as to be suitable for an item of work equipment to be operated and to communicate this configuration to the user.

Particularly advantageously, it is thus made possible for a user to implement on one and the same operating unit the most diverse functions depending on the item of work equipment to be controlled without a significant change in the position of his arm or wrist.

Provision is made in an embodiment of the invention such that the rotational axis of the cylinder is orientated roughly parallel to a surface of the at least one operating area. From a user's viewpoint, the cylinder is accordingly arranged horizontal, preferably such that the rotational axis is arranged beneath or in the region of the surface of the operating device facing a user, i.e. in or on the corresponding housing. According to the invention, however, an arrangement of the rotational axis above this surface would be less preferable. According to the invention, the lateral surface of the cylinder is facing the user, in particular only a part of the latter. According to the invention, at least one, but preferably a plurality of operating elements are arranged on the lateral surface, in particular in different radial and axial positions of the cylinder, as a result of which the functionality of this operating element according to the invention is particularly high and therefore adaptable to a particularly large number of operational situations.

Provision is made in an embodiment of the invention such that the at least one cylinder is arranged in the at least one operating area in such a way that only a part of its lateral surface is accessible from the exterior, or is accessible to a user. A part of the lateral surface is preferably concealed by the operating area, possibly also by a suitable molding or bulge of a housing which carries the operating area. This has the advantage that operating elements can be removed from access to a user by rotation beneath the housing/bulge, as a result of which they are at the same time inactivated. On the one hand, this enables secure mounting of the cylinder, on the other hand this embodiment reduces an undesired accumulation of the most diverse operating elements of the operating module in the operating area, in particular operating elements not required at the present time.

Provision is made in an embodiment of the invention such that, depending on the configuration, at least one operating element a) can be switched on or off in its function and/or b) can be changed in its spatial position and/or c) can be configured in the direction and/or range of its movement. In principle, this applies to all the operating elements of an operating module, but is particularly relevant in the case of joysticks. Here, for example, one of the horizontal movement axes would be able to be blocked or released, a pressure function in the z direction would be able to be blocked or released or the extent of a movement along one or both horizontal movement axes would be able to be changed, for example limited. According to the invention, the aforementioned configurations are also intended to include lowering or an otherwise achievable inaccessibility of the operating element and therefore the switching-off of its functionality. This reduces the number of operating elements visible to the user to those required precisely for the respective upcoming activity with a specific item of work equipment and thus meets the intuitive expectation of a user, according to which the right-hand/left-hand rotation of the operating element also triggers and controls a right-hand/left-hand movement of the item of work equipment. According to the invention, this also includes its relative position change with respect to the operating module. According to the invention, the latter can thus comprise operating elements fixed in position thereon as well as operating elements whose position can be changed, in particular their position can be changed with regard to an axial position.

Provision is made in an embodiment of the invention such that the at least one operating element can be deactivated by the fact that it is no longer accessible from the exterior due to a rotation of the cylinder, in particular behind or beneath a cover. This kind of inactivation according to the invention, as already mentioned, reduces the number of accessible—and therefore confusable—operating elements and protects the inactive ones against rough environmental influences. The operating elements can be arranged on the cylinder in such a way that, depending on the rotational position of the cylinder, always just one operating element is accessible from the exterior. Alternatively, there is also an embodiment according to the invention in which more than one operating element on the cylinder is accessible from the exterior in a specific rotational position.

Provision is made in an embodiment of the invention such that a configurable operating element has a function selected from the group formed by the basic functions: forwards/backwards, to the right/to the left, upwards/downwards, on/off, open/shut, more/less, rotate/swivel clockwise or anti-clockwise. This list is not to be understood as comprehensive, for example a particular item of work equipment could also have a particular other basic function not mentioned here.

Provision is made in an embodiment of the invention such that the at least one cylinder has a height between 10 mm and 40 mm, in particular a height between 20 mm and 30 mm. Cylinders of this size are sufficient to accommodate at least a number of sub-operating elements and at the same time small enough to occupy as small an area of the operating area as possible. Such dimensions are advantageous, since they correspond roughly to the width of a user's finger. A plurality of cylinders arranged beside one another can thus be operated particularly well simultaneously with one hand.

Provision is made in an embodiment of the invention such that a plurality of operating modules are arranged beside one another in the at least one operating area, in particular with coaxial rotational axes. A plurality of permutations of options are thus available to the user for configuring the operating elements of an operating area according to his requirements or the requirements of the work machine, for example when more sub-operating elements or operating elements are required to control an item of work equipment. According to the invention, the rotational axes can also be arranged non-coaxial, in particular arch-like, for example when a rotational movement in a user's wrist is to be taken into account, which the latter must make to operate different operating elements on different operating modules.

Provision is made in an embodiment of the invention such that it comprises at least one joystick arranged in particular on the at least one cylinder. According to the invention, joystick is also understood to mean mini-joysticks and in particular uniaxial thumbwheels. A particularly large number of functions can thus be integrated into this operating element, since the latter is controlled via a plurality of axes. Thus, for example, a joystick turned away by the user on the cylinder can control an upward/downward movement, whereas the same joystick rotated into a position close to the user controls a forward/backward movement.

Provision is made in an embodiment of the invention such that it comprises a recognition device, which recognizes the nature of an item of work equipment coupled when in use to a tractor comprising the operating device. If the nature of the coupled item of work equipment is known to the operating device, the latter can preferably be automatically configured, alternatively also manually, in such a way that the operating elements of the operating device can perform such functions as are required for the operation of a tractor with the corresponding coupled item of work equipment.

Provision is made in an embodiment of the invention such that the configuration device cooperates with the recognition device in such a way that it configures the functionality of at least one operating module and/or operating element depending on the nature of the coupled item of work equipment. The invention thus very advantageously enables the use of one and the same operating module for performing wholly different functions, the nature of which when in use is determined depending on the item of work equipment coupled in each case. According to the invention, a user is thus able to raise/lower a front lifting gear with one and the same operating element—or one and the same operating elements—of an operating module in the case of one item of work equipment, to allow the scraper floor to run forwards/backwards in the case of another item of work equipment or to fold a linkage downwards/upwards in the case of a third item of work equipment. The recognition device according to the invention is required for this, which in the simplest case is a data input unit to which a user personally communicates, for example by means of a keyboard, a speech command, a touch screen, which item of work equipment is coupled. According to the invention, the recognition device can also be an interface, through which the device receives the corresponding information, for example from an internal communication bus of the tractor and therefore from another control device.

According to the invention, the device can comprise for this purpose a database, in which the corresponding data of the individual items of work equipment are stored and which the device accesses for the assignment. The database and corresponding computers and data processing units are also part of the device according to the invention. This database accordingly also includes one or more data acquisition modules, in particular in the form of an input unit, which either automatically recognizes the item of work equipment, or in which the data input takes place manually, for example in the form of a selection of the item of work equipment from a table or summary list. As already described, the required information can also be communicated via a bus system of the item of work equipment itself or of the tractor, so that the recognition device is a data interface, which at the same time is also a data acquisition module. In this case, the input unit and any other control devices should be assigned more to the tractor or the item of work equipment than to the operating unit.

Provision is made in an embodiment of the invention such that a first operating area is configured such that the at least one operating element thereof controls the operating movements typically occurring most frequently with the item of work equipment and that a second and each further operating area are configured such that the one or more operating elements thereof control the operating movements typically occurring the second most frequently, the third most frequently, the nth most frequently with the item of work equipment. To very great advantage, the invention thus makes it possible to concentrate the most frequent operating functions of an item of work equipment in an operating area which lies closest to a resting position of an operator's arm, or is arranged in the resting position. In the case of a plough as an item of work equipment, this would for example be an upward and downward movement of the rear linkage. A second most frequent operating function would for example be changing the work width or the front furrow width of the reversible plough. Since such functions have to be carried out less frequently however during a work procedure, a high degree of ergonomic efficiency arises for a user. This is always important especially when the latter has had to work with the item of work equipment for a long period, in particular for several hours. Such cases arise for example very frequently in the case of agricultural service supply agencies, whose tractor drivers are occupied for whole working days, for example with soil tillage or taking over harvested maize, grain, rapeseed, grass etc. from combined harvesters or field choppers in their attached loader wagons and removing them.

If every operating area has a display element, it is easily and clearly signaled to the user which functions are assigned precisely to the operating elements. Instead of a large display element, as represented by a large display screen that is usually present, small, in particular LED-based screens, that are not touch-sensitive, are present according to the invention. This has the advantage that the operating element, in place of a generic functional description, is labelled with "lower/raise mower" or "sewing machine blower on/off" depending on the item of work equipment.

To great advantage, the invention no longer assigns fixedly determined tractor functions to the operating elements, but rather a primary, secondary or tertiary function of an item of work equipment, irrespective of the tractor function through which the latter are reached. According to the invention, one and the same operating element can thus control by reconfiguration completely different tractor functions one after another in time and depending on the item of work equipment. According to the invention, one and the same operating element thus controls for example sometimes the rear linkage, sometimes the power take-off shaft, sometimes a hydraulic valve and sometimes is without a function.

If the operating areas are constituted as adjacent areas, in particular as segments of a circle, in particular such that they are arranged so that they can be reached and operated by a user when in use by rotation of the elbow joint and/or wrist, a particularly ergonomic operation is thus advantageously achieved. The arrangement according to the invention in the manner of segments of a circle does not only mean an arrangement in the strictly mathematical sense, but rather all arrangements of the operating areas are included, also oval, elliptical or generally curved ones, as long as the latter can be reached by a user's fingers by a predominant rotational/swiveling movement of the user's arm.

Provision is made in a development of the invention such that the first operating area, in particular its operating element, can be reached and operated from a non-rotated position of a user's arm and/or that second, third and further operating areas are constituted so as to be able to be reached and operated with greater rotation in each case.

A method for adaptation of an operating device according to the invention is also provided, comprising the steps: a) identification of a coupled item of work equipment and/or the position of one or more operating elements of an in particular cylindrical operating module by means of a recognition device, b) selection of the operating functions required for the coupled item of work equipment from a group of basic functions stored for each item of work equipment, c) creation of a hierarchy of the selected operating functions according to frequency of use and d) assignment of the operating function most frequently used to the at least one operating element of the at least one operating module of the first operating area and the further most frequently used operating functions, in descending order, to the operating areas that can be reached and operated in each case after greater rotation.

The steps are not necessarily to be carried out successively and directly following one another in this order, some of them being able to take place according to the invention also in parallel or in inverted order, or being able to be followed by other process steps not yet mentioned. Here, however, the identification is preferably always in first place in the process steps. According to the invention, the latter can take place manually by any kind of input or selection from a displayed list of items of work equipment or automatically by for example a RFID-Tag or other communication options between the item of work equipment and the operating device. The identification of the cylinder position preferably takes place via internal, in particular cable-bound, communication.

According to a further step of the method according to the invention, a number of basic functions required for the recognized item of work equipment is selected, for example raise-lower-rotate in the case of a plough, and put into a hierarchy corresponding to their frequency of use. The method according to the invention takes recourse here to a previously compiled database, which contains, for all the types of work equipment, the respective functions and their frequency when the item of equipment is used. Before the method according to the invention is used, therefore, the steps of determining these functions and their frequency have to be carried out, the latter being much more time-consuming. These data are stored in a database to which the method takes recourse.

Provision is made in a development of the method such that the operating elements are changed, depending on the assigned operating function, in terms of their degrees of freedom, the extent to their deflection, the force required for a deflection, their readiness for operation, their position in the respective operating area. The advantages have already been described.

Finally, provision is also made in a development such that the function assigned to an operating element is displayed on a display in or after step d).

The invention is described by way of example in a preferred embodiment making reference to a drawing, wherein further advantageous details can be seen in the figures of the drawing. Functionally identical parts are provided with the same reference numbers.

The drawings are provided herewith for purely illustrative purposes and are not intended to limit the scope of the present invention.

DETAILED DESCRIPTION OF THE DRAWINGS

Figure 1:
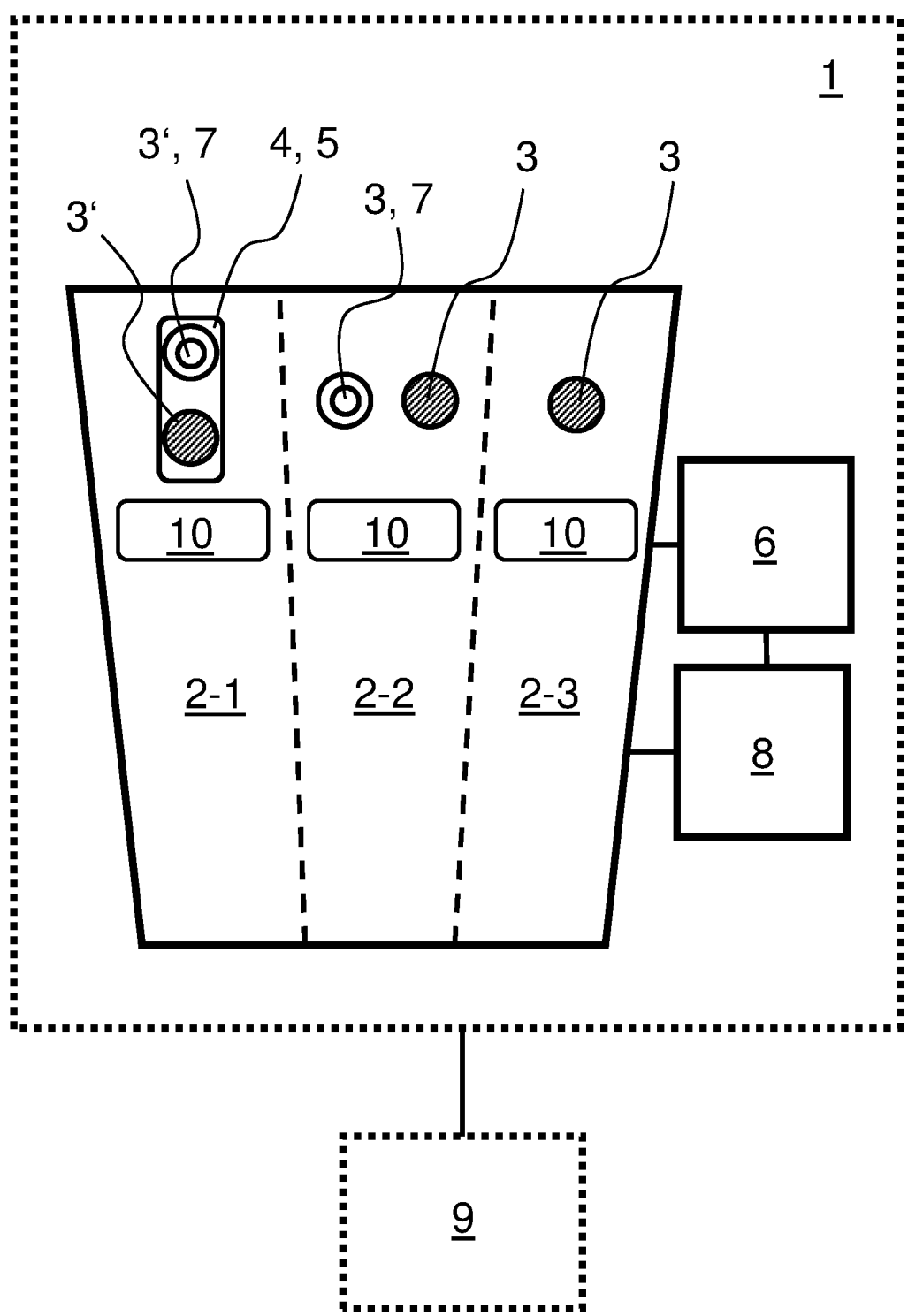
FIG. 1 shows a diagrammatic representation of an adaptive operating device according to the invention and FIG. 2 shows a cross-sectional drawing of a cylinder according to the invention with a joystick in three different rotational positions.

FIG. 1 shows a diagrammatic representation of an adaptive operating device 1 according to the invention. Operating device 1 generally comprises a plurality of operating areas 2-1, 2-2, 2-3, a recognition device 8 and a configuration device 6. The most diverse arrangements of operating elements 3 are possible in the different operating areas 2-1, 2-2, 2-3, which in the present example of embodiment are constituted in the form of simple knobs or joysticks 7. Operating modules 4 according to the invention are provided beside the latter, which are constituted in particular in the form of cylinders 5, and which each carry at least one operating element 3'. According to the invention, operating elements 3' of an operating module 4 are pushbuttons, switches, thumbwheels, joysticks or others. Operating elements 3 and 3' can also be constituted identically and differ only in their arrangements on an operating module 4 or operating element 2-n. Furthermore, a display field 10 is arranged in each operating area 2, with the aid of which the current configuration of operating area 2 or in particular operating elements 3 located in the respective operating area 2, in particular operating elements 3' arranged on operating module 4, can be seen. The configuration is applied to operating areas 2 by means of communication device 6 communicating with operating areas 2. The configuration can take place by a manual or automatic input. In the embodiment shown, operating device 1 comprises a recognition device 8, which recognizes items of work equipment 9 attached to the tractor which comprises operating device 1. For this purpose, recognition device 8 communicates with configuration device 6, so that the information of the type of work equipment 9 attached to the tractor determines the configuration of operating areas 2 and operating elements 3 and 3' carried out by configuration device 6. Accordingly, these elements are configured in such a way that the latter perform functions which are relevant for the control of attached item of equipment 9. It is important to emphasize that an operating module 4 alone with at least one operating element 3' is also in accordance with the invention, as long as it's at least one operating element 3' can be changed in its functionality as described.

Figure 2:
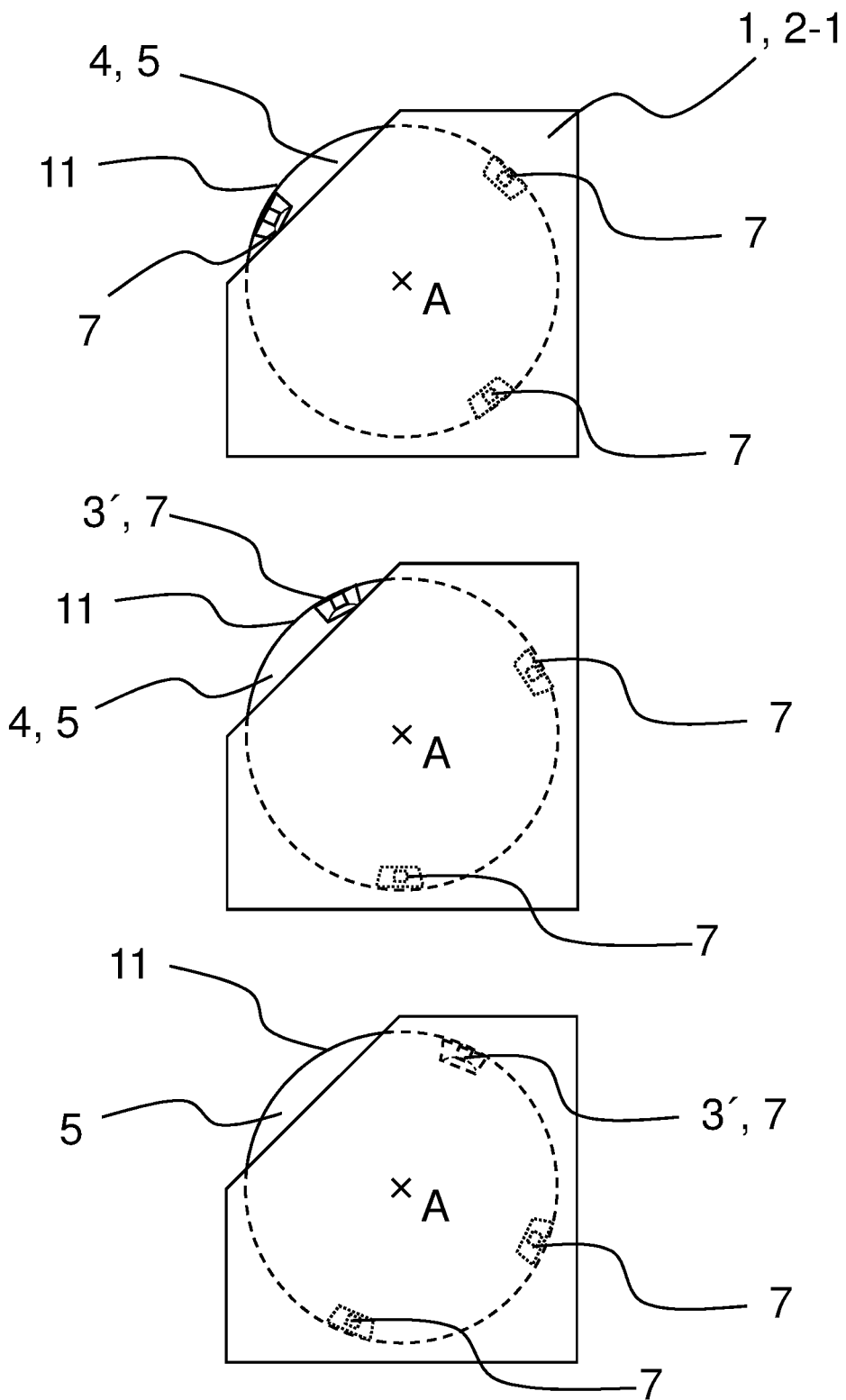

FIG. 2 shows a cross-sectional drawing of cylinder 5 according to the invention with an operating element 3'—a joystick 7 here—in three different rotational positions inside a housing indicated by a pentagonal body, which at the same time stands for adaptive operating device 1 as a whole and an operating area 2-1 in particular. The peripheral sections of cylinder 5 not visible and/or accessible from the exterior are represented with dashed lines. The other operating elements 3', which are arranged on operating module 4 in this axial cross-sectional plane, are also represented by dashed lines. In this representation, rotational axis A of cylinder 5 intersects the plane of the representation orthogonally, a user's hand would lie on top of the housing, his fingers would follow the curvature of cylinder 5, in particular lateral surface 11 of cylinder 5 shaped as a cylindrical outer surface. An embodiment according to the invention in which two operating elements 3' would be accessible simultaneously is not represented.

In the first representation of cylinder 5 shown at the top, joystick 7 is depicted in a first, lower position, in particular a position close to the fingertips of a correspondingly bent user's hand. In this position, joystick 7 is performing a first operating function of the item of work equipment.

In the second representation of cylinder 5 shown in the middle, joystick 7 is located in a second, upper position, in particular a position which is closer to a wrist of a user than the previously described one. In this second position different from the first position, joystick 7 is controlling a second function, which differs or can differ from the first function.

In the third position shown, joystick 7 is not accessible to the user, joystick 7 being rotated into a housing interior of the operating device. Joystick 7 is preferably switched off in such a position not accessible to the user. The precise position at which joystick 7 is located in the housing interior is immaterial according to the invention. The first function can be a upward/downward movement on account of the largely vertical position of joystick 7, whereas the second function can be a forward/backward movement on account of the more horizontal position of joystick 7. Other functions and other constellations of the operating element, rotational position of cylinder 4 and function are also in accordance with the invention, in particular such constellations as appear most reasonable for the item of work equipment attached to the tractor.

While the above description constitutes the preferred embodiments of the present invention, the invention is susceptible to modification, variation and change without departing from the proper scope and fair meaning of the accompanying claims.

The invention claimed is:

1. An adaptive operating device, comprising at least one operating area having at least one manually operable operating element, wherein at least one of the at least one operating element is arranged on an operating module embodied as a cylinder rotatably mounted in the operating area, wherein the operating device also includes a configuration device configured to perform at least one of the following two functions:
    changing a rotational position of the operating module; and
    changing a functionality of the operating element,
    the at least one function configuring the at least one operating element in such a way that a movement of the operating element causes an identical movement of an item of work equipment when coupled to a vehicle incorporating the adaptive operating device.

2. The adaptive operating device according to claim 1, wherein the cylinder has a rotational axis that is orientated parallel to a surface of the at least one operating area.

3. The adaptive operating device according to claim 1, wherein the cylinder has a cylindrical outer surface and is arranged in the at least one operating area in such a way that only a part of the cylindrical outer surface of the cylinder is accessible from the exterior.

4. The adaptive operating device according to claim 1, wherein at least one operating element of the at least one operating element is configured for undergoing at least one of the following changes for adapting to different work equipment:
    to be switched on or off;
    to change a spatial position of the operating element; and
    to change a direction or range of movement of the operating element.

5. The adaptive operating device according to claim 1, wherein the at least one operating element is configured to be deactivated by rotating the cylinder to a position, in which it is no longer accessible for operation.

6. The adaptive operating device according to claim 1, wherein a configurable operating element of the at least one operating element includes a function selected from the group consisting of the following basic functions:
    forward movement;
    backward movement;
    right movement;
    left movement;
    upward movement;
    downward movement;
    on-off switching;
    opening;
    closing;
    increase;
    decrease;
    rotate or swivel clockwise; and
    rotate or swivel counterclockwise.

7. The adaptive operating device according to claim 1, wherein the at least one cylinder has a height between 10 mm and 40 mm.

8. The adaptive operating device according to claim 7, wherein the at least one cylinder has a height between 20 mm and 30 mm.

9. The adaptive operating device according to claim 1, wherein the at least one cylinder is a plurality of cylinders arranged beside one another in the at least one operating area.

10. The adaptive operating device according to claim 1, wherein the at least one operating element comprises at least one joystick.

11. The adaptive operating device according to claim 10, wherein the joystick is arranged on the at least one cylinder.

12. The adaptive operating device according to claim 1, further comprising a recognition device, configured to recognize the item of work equipment when the item of work equipment is coupled to a tractor comprising the operating device.

13. The adaptive operating device according to claim 1, wherein the configuration device is configured to cooperate with the recognition device in such a way that the configuration device configures a functionality of at least one of the at least one operating area and the at least one operating element in adaptation to the coupled item of work equipment.

* * * * *